United States Patent [19]
Vornberger

[11] 3,811,729
[45] May 21, 1974

[54] DUMP TRAILER HAVING AUTOMATIC TAIL GATE LOCK

[75] Inventor: George F. Vornberger, Cincinnati, Ohio

[73] Assignee: Pullman Incorporated, Chicago, Ill.

[22] Filed: Dec. 11, 1972

[21] Appl. No.: 313,884

[52] U.S. Cl. ............................................. 298/23 M
[51] Int. Cl. ............................................... B60p 1/26
[58] Field of Search .............. 298/23 M, 23 A, 23 B

[56] References Cited
UNITED STATES PATENTS

| | | | |
|---|---|---|---|
| 3,111,346 | 11/1963 | Harbers | 298/23 M X |
| 2,983,548 | 5/1961 | Harbers | 298/23 M |
| 2,868,583 | 1/1959 | Harbers | 298/23 M |
| 3,404,918 | 10/1968 | Lackey | 298/23 M |

FOREIGN PATENTS OR APPLICATIONS
1,927,057  1/1970  Germany .......................... 298/23 M Primary Examiner—Richard J. Johnson
Attorney, Agent, or Firm—Hilmond O. Vogel

[57] ABSTRACT

A dump truck trailer body having a swinging tail gate engaged by a pneumatically operated locking arrangement comprising a swinging spring biased locking hook operatively attached to a pneumatic cylinder which is actuated to disengage the locking hook from the swinging tail gate and permit gate opening. Release of air pressure from the pneumatic operating cylinder allows the hook biasing springs to force the locking hook into locking engagement with the lower portion of the swinging tail gate.

5 Claims, 6 Drawing Figures

DUMP TRAILER HAVING AUTOMATIC TAIL GATE LOCK

BACKGROUND OF THE INVENTION

1. Field of the Invention

This invention pertains to large dump trucks having pivoted trailer bodies which are raised and lowered to discharge lading and more particularly to an automatic tail gate locking arrangement.

2. Description of the Prior Art

Prior art tail gate locking devices generally include manually operable hook members which secure the tail gate to the trailer body and require the truck operator to lock and unlock the trailer gate prior to lowering and raising of the pivoted trailer body.

SUMMARY

The present invention pertains to trailer bodies which are rotatable to discharge lading through a tail gate opening. An automatic tail gate locking and unlocking device is provided at each side of the swinging tail gate member and is selectively operable by suitable valving means to pneumatically and automatically unlock and lock the tail gate. The tail gate locking member is a pivoted bell crank hooking member which is mounted on the truck body and which is biased by a heavy spring to lock the tail gate when air pressure is removed from the operating cylinder.

It is an object of the present invention to provide an automatic tail gate locking device having a pivoted locking hook which is selectively moved into and from engagement with the tail gate of the pivoting trailer body.

It is yet another object of the present invention to provide an automatic locking device positioned at the transverse side edges of a swinging tail gate whereby the locking components may be easily assembled to the trailer body and also easily serviced should maintenance be required.

Another object of the present invention is to provide a rotating tail gate locking hook pivotally mounted on a bell crank arm assembly and operatively connected to a yoke member with a pneumatic operating cylinder.

These and other objects of the invention will become apparent from reference to the following description, attached drawings and appended claims.

DESCRIPTION OF THE PREFERRED EMBODIMENT

Figure 1:
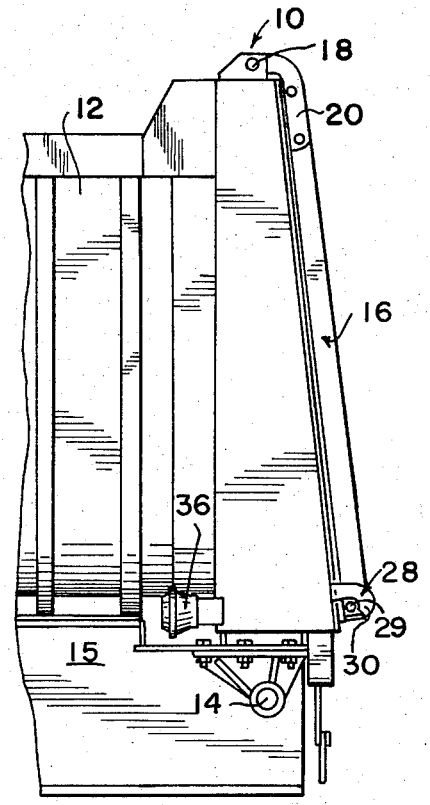
FIG. 1 is a side elevational view of the end portion of the trailer involved in the present invention.
Figure 2:
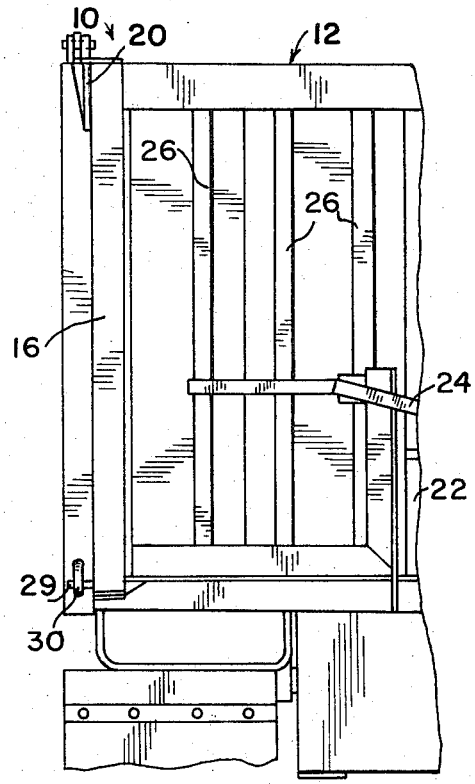
FIG. 2 is an end view of the portion of the truck illustrated in FIG. 1.
Figure 5:
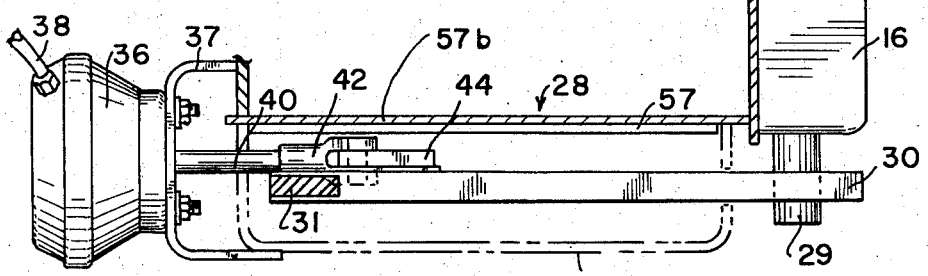
FIG. 5 is a cross sectional view taken along lines 5—5 of FIG. 3.
Figure 6:
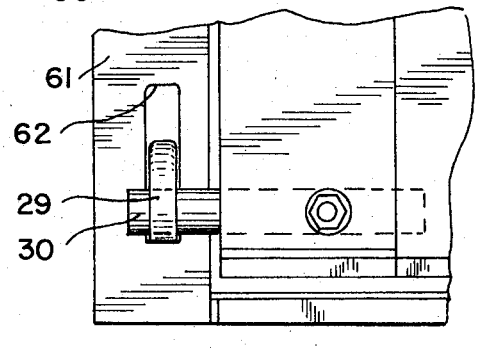
FIG. 6 is a view taken along lines 6—6 of FIG. 3.
Figure 4:
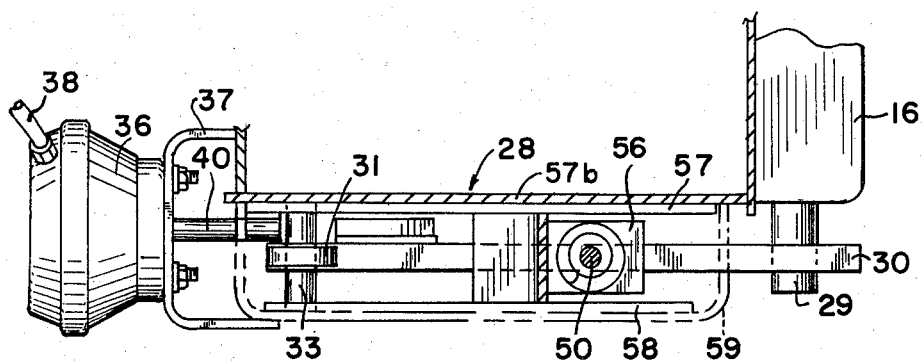
FIG. 4 is a cross sectional view taken generally along lines 4—4 of FIG. 3.

Referring now to the drawings and in particular to FIG. 1, there is shown a side elevational view of the end portion of a dump trailer 10 having a pivoting back section or body 12 which is rotatable about the pivot hinge assembly 14 to permit the discharge of material contained within the body 12.

A supporting underframe or chassis 15 rigidly supports the dump truck trailer back section or trailer portion 12. The trailer portion 12 includes an open back section which is closed off by the swinging tail gate 16 which is pivoted through the upper hinge pivots 18. Hinge brackets 20 connect the tail gate 16 to the pivot support brackets 18. The tail gate 16 includes the usual vertically reciprocable discharge door 22 which is operable through use of its associated door operating lever mechanism 24. The tail gate 16 also includes a plurality of vertically extending rigidifying members 26.

The gate locking assembly of the present invention is illustrated in FIGS. 3–6 and includes a lock assembly 28 which is operable to engage the locking pin 29 which is fixedly attached to the lower portion of the tail gate 16 and extends transversely therefrom. The lock assembly 28 includes a bell crank type of locking arm or hook 30 which is pivotally mounted to be engageable with the locking pin 29. The lock assembly 28 also includes a generally vertically extending arm portion 31 and a reinforcing gusset 32 which connects the horizontally extending hooking arm 30 with the locking arm vertical portion 31. The locking arm assembly 28 pivots about the fixed pivot point 33.

Figure 3:
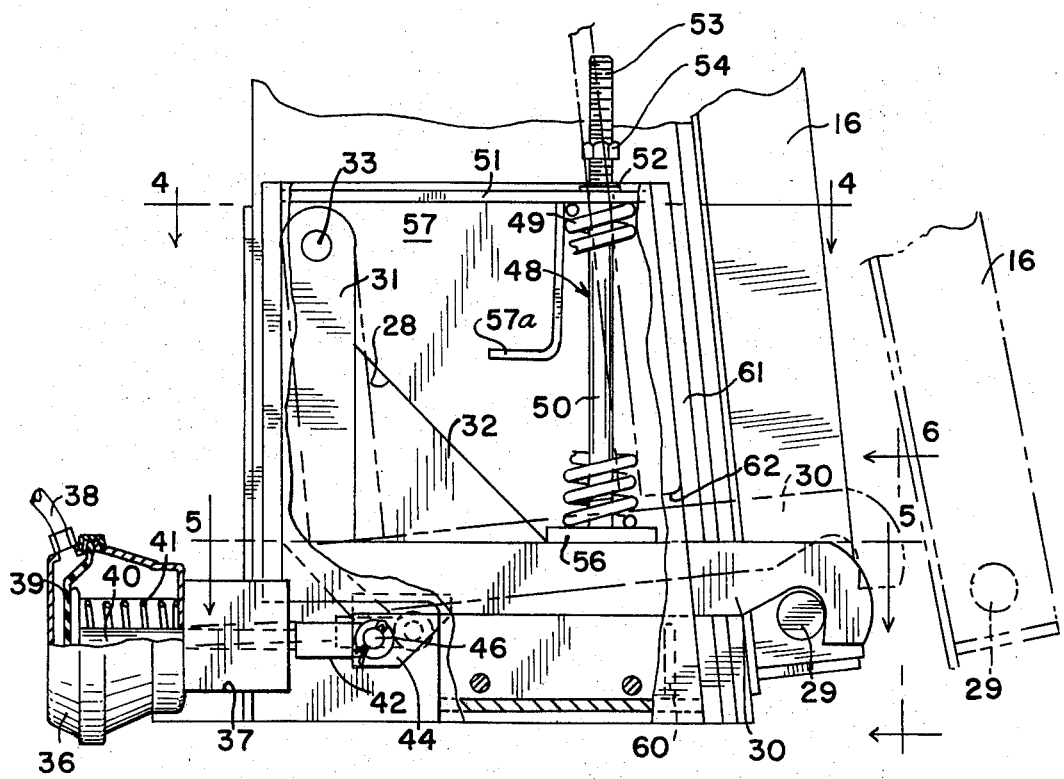
FIG. 3 is an enlarged view of the automatic gate locking device of the present invention.

An operating chamber 36 provides the moving force to the swinging locking arm assembly 28 and is rigidly mounted to the trailer 12 by the mounting bracket 37. The air line 38 permits high pressure air to flow into the operating chamber 36 and thereby move the rubber diaphram 39 longitudinally to the right as illustrated in FIG. 3. Also associated with the operating chamber 36 is a helical biasing spring 41 which is used to return the rubber diaphragm and associated drive rod 40 when air pressure is removed from the chamber. A connecting yoke 42 attaches the drive rod to the locking arm assembly 28 to provide for pivoting rotational movement of the locking arm upon longitudinal horizontal movement of the operating chamber drive rod 40. A connecting block 44 is fitted to the underside of the locking arm hook member 30 for convenient attachment to the yoke 42 by utilization of a pivot pin 46 which extends through openings in both the yoke 42 and the connecting block 44.

Operatively connected with the rotating locking arm assembly 28 is a biasing return spring assembly 48 which is best illustrated in FIG. 3. This assembly is operatively connected to the horizontally extending locking arm hook portion 30 and includes a coil spring member 49 which is positioned about the associated spring guide rod 50. The guide rod 50 extends through a top mounting plate 51. The top mounting plate 51 is preassembled to return spring assembly to provide a preload on the coil spring 49. The spring 49 urges the lock arm assembly 28 counterclockwise and into locking engagement with the locking pin 29 of the tail gate 16 when plate 51 is welded to the truck body and nut 54 is loosened. The spring guide rod 50 extends through an opening in the top plate 51 and is positioned for guided movement in washer 52. Guide plate unit 56 is used to attach the biasing spring guide rod 50 to the locking arm 30.

A cover case 59 encapsules the rotating locking assembly 28 to prevent contamination by airborne debris or moisture which could prevent operation of the locking device. A plate 57 forms an attaching and mounting surface for the locking arm pivot 33 and also has an L-shaped spacer bracket 57a attached thereon. The cover 59 has an outer wall 58 which abuts the pivot 33 and the spacing bracket 57a and may be held against these members by bolts or by light tack welds. The cover member 59 encloses the pivoting locking arm and its associated biasing spring 48 and extends upwardly as does the inner wall 57b. Contained within the cover 59 is a hook stop plate 60 which is essentially a small transversely extending bar which locates the bottom limit of locking arm travel. The cover 59 includes an end wall 61 having a slotted opening 62 contained therein to permit positioning of and movement of the locking hook portion 30 of the locking arm assembly 28.

Thus it is noticed that the device of the present invention provides a means for automatic and remote locking and unlocking a dump truck tail gate. The bell crank locking hook 30 is mounted at the transverse end side portion of the truck body for ease of mounting and servicing. The combination of the bell crank locking hook 30 and the actuating chamber 36 translates horizontal reciprocal movement of a power drive rod 40 into generally vertical reciprocal movement of the gate hooking portion of the locking arm unit 28.

The locking device 28 may be preassembled to the mounting plate 57 and attached to the truck as a module which is easily adjusted and connected into the air lines of the truck.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A vehicle dump body pivotally mounted on a supporting chassis and including a hinged discharge tail gate movable between a closed locked position and an unlocked open position, the improvement comprising:

an automatic gate locking device having a pivoting locking hook including bell crank means having a horizontally extending portion lockingly engageable with associated locking portions of the discharge gate;

a hook operating means having a reciprocable drive rod connected to said locking hook to thereby translate reciprocating rod movement into gate locking and unlocking rotation of the locking hook;

said bell crank means pivotally attached to the vehicle dump body at a pivot point vertically spaced from the hook operating means to thereby provide for generally vertical movement of said locking hook upon actuation of the reciprocable drive rod of the hook operating means;

biasing means operatively connected with the locking hook and urging said hook into the locked position;

said locking hook being preassembled in a housing module having a mounting plate portion abutting and attached to said dump body.

2. A vehicle dump body pivotally mounted on a supporting chassis and including a hinged discharge tail gate movable between a closed locked position and an unlocked open position, the improvement comprising:

an automatic gate locking device having a pivoting locking hook lockingly engageable with associated locking portions of the discharge gate;

a hook operating means having a reciprocable drive rod connected to said locking hook to thereby translate reciprocating rod movement into gate locking and unlocking rotation of the locking hook;

biasing means operatively connected with the locking hook and urging said hook into the locked position;

said hook operating means including a pneumatically actuated operating chamber having a drive rod connected piston means operatively associated with the gate locking hook;

said operating chamber having a biasing spring urging the drive rod and locking hook into the gate locked position; and said locking hook being preassembled in a housing module having a mounting plate portion abutting and attached to said dump body.

3. A vehicle dump body pivotally mounted on a supporting chassis and including a hinged discharge tail gate movable between a closed locked position and an unlocked open position, the improvement comprising:

an automatic gate locking device having a pivoting locking hook lockingly engageable with associated locking portions of the discharge gate;

a hook operating means having a reciprocable drive rod connected to said locking hook to thereby translate reciprocating rod movement into gate locking and unlocking rotation of the locking hook;

said locking hook being preassembled in a housing module having a mounting plate portion abutting and attached to said dump body; and a locking hook biasing means operatively connected between the locking hook and said housing module, and a coil spring positioned about said guide rod and thereby urging the locking hook downward into locking engagement with said discharge tail gate.

4. A vehicle dump body pivotally mounted on a supporting chassis and including a hinged discharge tail gate movable between a closed locked position and an unlocked open position, the improvement comprising:

a pair of automatic gate locking devices, each device having a pivoting locking hook lockingly engageable with an associated locking portion of the discharge gate;

a hook operating means having a reciprocable drive rod connected to said locking hook to thereby translate reciprocating rod movement into gate locking and unlocking rotation of the locking hook;

biasing means operatively connected with the locking hook and urging said hook into the locked position;

said tail gate having a pair of spaced locking pins extending transversely therefrom; each of said locking hooks of a respective gate locking device extending longitudinally of the vehicle and engageable with one of the gate locking pins;

each said locking hook being preassembled in a housing module having a mounting plate portion abutting and attached to a respective sidewall of said dump body.

5. A locking device for use of a dump truck tail gate and the improvement comprising:

pivoting bell crank locking means having a gate engaging locking hook portion and operatively connected with a pneumatic actuating means having a reciprocable drive rod pivotally connected to the bell crank;

said pneumatic actuating means having a rubber diaphragm piston portion operatively connected to drive the reciprocable drive rod;

said drive rod having a bell crank connecting portion to thereby provide for translation of horizontal reciprocal movement of the drive rod into general vertical locking and unlocking pivotal movement of the locking hook portion of the bell crank locking means;

bell crank biasing spring and guide rod means positioned to supply a locking biasing force to the locking device urging the locking hook portion of the bell crank into locking engagement with said tail gate;

a mounting plate means forming a rigid attaching member for the pivoting bell crank locking means and having a horizontally extending plate portion forming a bias stop for said bell crank biasing spring and thereby providing a lock module assembly for ease of attachment to said dump truck;

said dump truck tail gate having a pair of laterally extending locking pins;

said locking hook portion of the locking device positioned to extend longitudinally of the dump truck and engageable with an associated locking pin of the tail gate.

* * * * *